United States Patent
Kritt et al.

(10) Patent No.: US 8,712,100 B2
(45) Date of Patent: *Apr. 29, 2014

(54) PROFILING ACTIVITY THROUGH VIDEO SURVEILLANCE

(75) Inventors: Barry A. Kritt, Research Triangle Park, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/483,091

(22) Filed: May 30, 2012

(65) Prior Publication Data

US 2013/0322682 A1 Dec. 5, 2013

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| | | |
|---|---|---|
| 7,225,122 B2 | 5/2007 | Shaw |
| 7,805,391 B2 | 9/2010 | Friedlander et al. |
| 2006/0085469 A1 | 4/2006 | Pfeiffer et al. |
| 2007/0010993 A1 | 1/2007 | Bachenko et al. |
| 2008/0201116 A1 | 8/2008 | Ozdemir et al. |
| 2008/0288430 A1* | 11/2008 | Friedlander et al. ............ 706/46 |
| 2010/0208063 A1* | 8/2010 | Lee et al. ...................... 348/143 |

OTHER PUBLICATIONS

Nallapati et al., Extraction of Key Words from News Stories, CIIR Technical Report # IR-345, 2002.

* cited by examiner

*Primary Examiner* — Stephen R Koziol
*Assistant Examiner* — Amandeep Saini
(74) *Attorney, Agent, or Firm* — Lieberman & Brandsdorfer, LLC

(57) ABSTRACT

Embodiments of the invention relate to profiling activity. Content is captured and keywords are identified in the captured content. In response to the keyword identification, rules associated with the keywords are identified. These rules are employed to identify and capture relevant content in real-time.

12 Claims, 4 Drawing Sheets

PROFILING ACTIVITY THROUGH VIDEO SURVEILLANCE

BACKGROUND

1. Technical Field

The present invention relates to a system and computer program product for profiling activity and behavior. More specifically, the invention relates to a system and computer program product that profiles activity and integrated video surveillance with the profile activity.

2. Description of the Prior Art

The growth of technology and the Internet has created an environment that has an abundant quantity of digital data available to any computer with access to the Internet. The data is static and stale. More specifically, the data generally reports on current or past activities, and from time to time includes an analysis of past activity. Video surveillance has been known to be tied into current events associated with the digital data. Specifically, conventional surveillance systems detect potential threats based on predefined patterns. Such surveillance systems do not account for changes in behavior or associated data patterns. Accordingly, there is a need to leverage the digital data and to dynamically apply the surveillance to current data.

SUMMARY OF THE INVENTION

This invention comprises a system and computer program product for integrating data processing with video surveillance.

In one aspect, a system is provided with a processor in communication with storage media. A functional unit is provided in communication with the processor. The functional unit includes tools to profile activity. The tools include a data manager, an association manager, a rule manager, and a capture manager. The data manager functions to capture digital media content and to identify objects from the captured content. The association manager functions to associate the identified objects with one or more keywords. The rule manager functions to identify one or more surveillance rules associated with the keyword. Following the identification of the surveillance rules, the capture manager dynamically applies the rule to a surveillance system. More specifically, the capture manager captures data associated with the identified rules and content.

In another aspect, a computer program product is provided. The computer program product includes a computer-readable storage medium having computer readable program code embodied thereon, which when executed causes a computer to implement a method of capturing digital media content. More specifically, the computer program product supports identification of possible objects from captured digital content and association of the identified objects with at least one keyword. Surveillance rules are provided that includes one or more combinations of keywords. In response to application of combinations of the keywords from the identified objects, an applicable surveillance rule is identified and dynamically applied to capture relevant data in real-time. More specifically, the applicable rule is applied to capture digital media content pertaining to the applicable rule associated with the identified objects and keywords.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
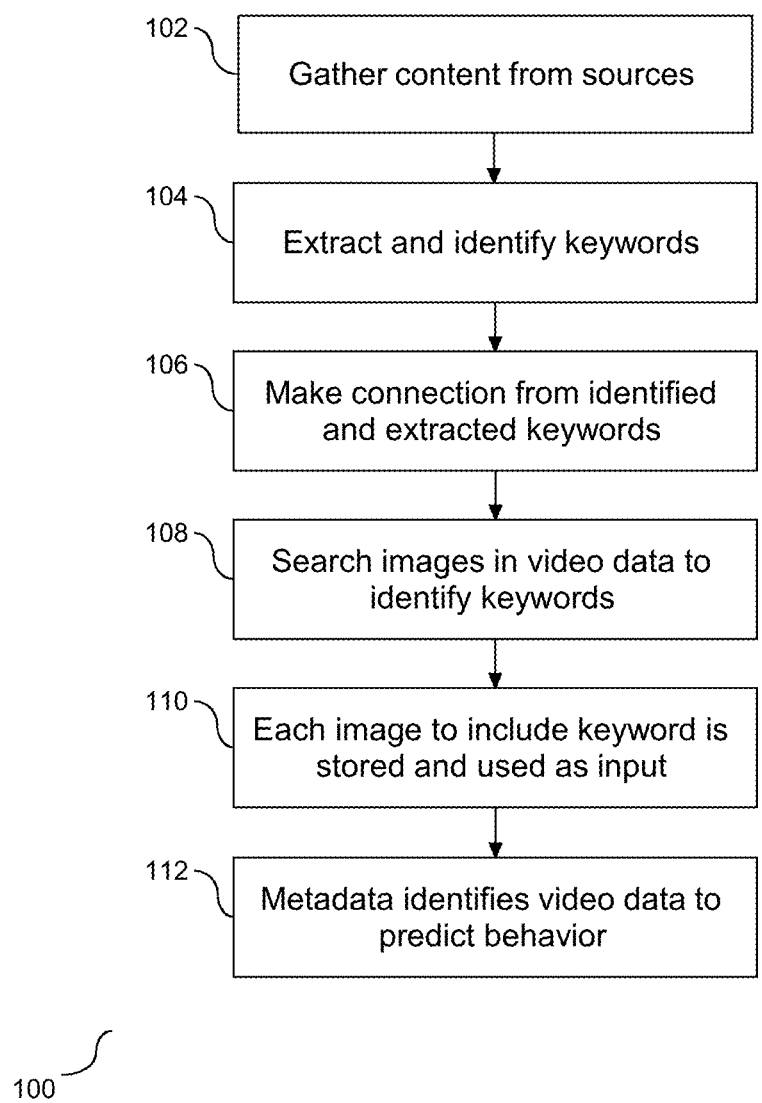
FIG. 1 depicts a flow chart illustrating identifying data and predicting a future action based on text data analysis.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

In data mining, associated rule learning is a popular and well researched method for discovering interesting relations between variables in large databases. Such information can be used as the basis for decisions about marketing activities. With the abundance of data available, there is a need to gather and organize the data, and to identify relationships among the gathered data. All text data and associated content is a function of keywords and/or phrases. The following table may be employed to define relationships among data content:

TABLE 1

| | |
|---|---|
| $Document_1$ | f ($keyword_1$, $keyword_2$, $keyword_3$, $keyword_4$) |
| $Document_2$ | f ($keyword_2$, $keyword_5$, $keyword_3$, $keyword_7$) |
| $Document_3$ | f ($keyword_4$, $keyword_7$, $keyword_1$, $keyword_2$) |
| $Document_4$ | f ($keyword_7$, $keyword_8$, $keyword_1$, $keyword_2$) |

To further elaborate, based on the table a first document, $document_1$, includes a combination of $keyword_1$, $keyword_2$, $keyword_3$, and $keyword_4$. Similarly, a second document, $document_2$, includes a combination of $keyword_2$, $keyword_5$, $keyword_3$, and $keyword_7$. A third document, $document_3$, includes a combination of $keyword_4$, $keyword_7$, $keyword_1$, and $keyword_2$. A fourth document, $document_4$, includes a combination of $keyword_7$, $keyword_8$, $keyword_1$, and $keyword_2$. In the example shown above, if $keyword_1$ and $keyword_2$ appear together, there is a possibility that $keyword_7$ may be present. Accordingly, a relationship can be established based on the presence of select keywords appearing together.

The combination of keywords in a select document may be extrapolated to different scenarios and environments. FIG. 1 is a flow chart (100) illustrating identification of a predicted incident identified from text analysis. The first part of the prediction process requires data mining, and establishing and identifying relationships in the mined data. As shown at (102), software is employed to gather content from a plurality of sources. In one embodiment, the content may be text based and includes data from web pages, electronic mail content, instant message content, transcripts of conversations, etc. Keywords are identified and extracted from the mined data (104). Content is the function of keywords and phrases. For example, text based content may be represented as a function of a combination of keywords and/or phrases. The identified and extracted keywords are illustrated as text based data. However, the invention should not be limited to this form of data, and may be expanded to include other forms, such as video data. Following step (104) a connection is made from the identified and extracted keywords (106). In one embodiment, the relationships among the keywords as demonstrated in the connections may be stored on an electronic medium. Accordingly, data is identified and extracted and employed to populate and create rules, e.g. surveillance rule, and associated relationships.

The established relationships among keywords may be applied to video formatted data. To utilize the established relationships to predict a future action, two forms of data are identified and used as input. Each image in video formatted data has one or more subjects and topics. Images in the video data are searched to identify any keywords employed in the relationships of extracted keywords (108). Each image determined to include the identified keywords is stored together with the identified keyword relationship (110), and is used as a first input, $input_1$. A second input, $input_2$, pertains to analysis of video data based on the established relationships of keywords. Metadata from the relationships is employed to identify video data to predict behavior and/or a different incident (112). Both the first input, $input_1$, and the second input, $input_2$, are employed to identify a possible predicted incident based on one or more objects. For example, an incident may be predicted based on one or more objects or persons identified in a location. Accordingly, the relationships formed among select keywords may be employed to predict future activity.

Figure 2:
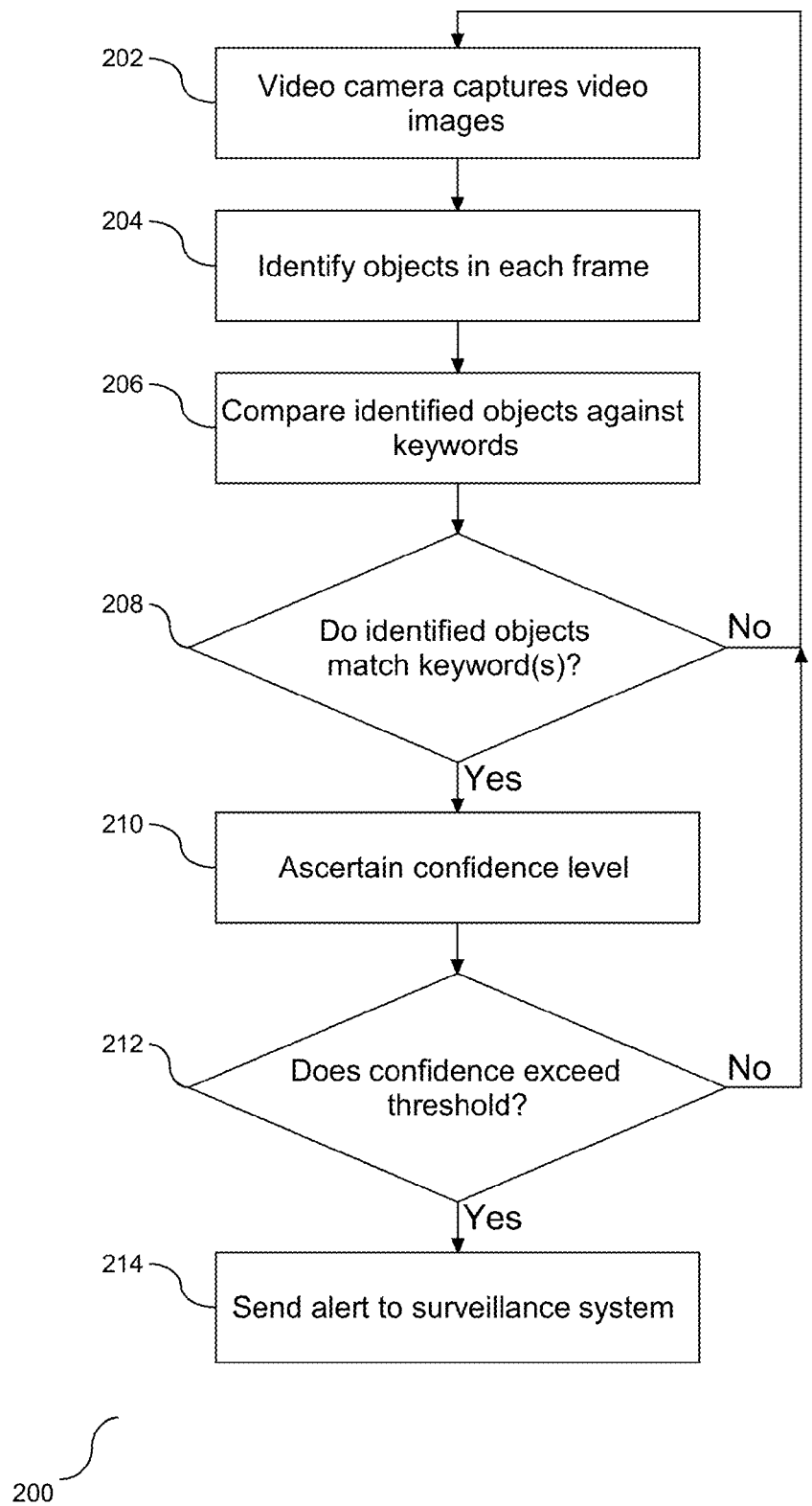
FIG. 2 depicts a flow chart illustrating integration of a video surveillance system with the predicted future action.

FIG. 2 is a flow chart (200) illustrating details of the prediction process. A video camera is employed to capture video images (202). In a surveillance system, the video camera may continuously capture the video to ensure security protocols are met. Objects in each video frame are identified (204), and following the identification, the objects are compared against the keywords in the keyword relationship (206). Accordingly, the rules established through the keyword relationships are applied to a surveillance system to capture data associated with the rules and content.

Following step (206), it is determined if the identified object(s) match with the keywords in the established rules (208). In one embodiment, the comparison at step (208) takes place in real-time. A positive response to the determination at step (208) is followed by ascertaining a level of confidence that the identified object from the captured data is associated with the keywords in the rules (210). In one embodiment, different tools may be utilized to determine a level of confidence with an identified object and for identifying if an object name matches with a keyword. As such, the scope of the invention should not be limited to the method and/or tool utilized for determining a level of confidence associated with the captured data. If the level of confidence exceeds a threshold level (212), an alert communication is sent to a surveillance system pertaining to current activity (214). Specifically, communication of the alert ensures that data that has exceeded the threshold level is captured in real-time. Conversely, a negative response to the determination at steps (208) or (212) is followed by a return to (202) for capturing image data. Accordingly, relevant data, surveillance or other data, may be captured in real-time through use of the keywords and rules.

As further demonstrated above in Table 1, patterns of relationships of keywords are established. Specifically, the combination of specific keywords in the established rules is employed to predict another keyword. For example, in a rule that includes three keywords, the presence of two out of the three keywords lends a likely indication that the third word may be present in data subject to evaluation. In addition to addressing pre-defined rules, new rules and associations may be dynamically defined and created. For example, a negative response to step (208) may be followed by determining how many times a confidence level has not been attained and the basis for this rejection (214). In one embodiment, if two out of three keywords are present, a new rule may be established that does not require the third keyword. This new rule may be desirable if a small quantity of activity data is being captured. At the same time, a new rule may be defined to capture less data. Such a new rule would have narrow parameters requiring the presence of additional keywords, or more clearly defined keywords. Similarly, in one embodiment, software may be employed for the creation of new rules in response to feedback from the captured activity. Accordingly, the defined rules may be dynamically modified in response to current activity.

Figure 3:
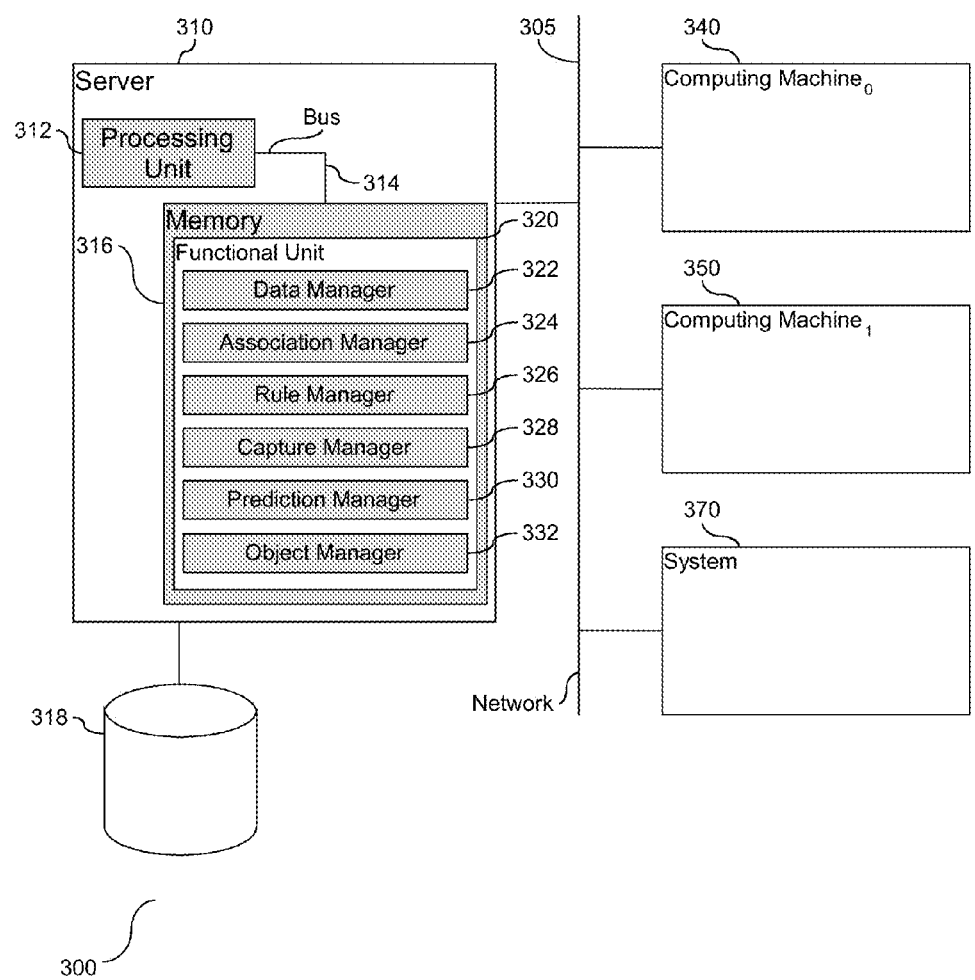
FIG. 3 depicts a block diagram illustrating tools embedded in a computer system to support an efficient and effective integration of data analysis and video surveillance.

The establishment of keyword identification and associated rules supports real-time capturing of video data. FIG. 3 is a block diagram (300) illustrating tools embedded in a computer system to support dynamic assessment of data and capturing of new video data in response to the assessment. For illustrative purposes, a computer system is provided with a server (310) in communication with storage media (318). The server (310) is provided with a processing unit (312) in communication with memory (316) across a bus (314).

The server (310) is shown in communication with computing machines (340) and (350) across the network (305). A functional unit (320) is provided in communication with memory (316); the functional unit (320) supports management of tools to profile activity. As shown, the functional unit (320) is provided with a data manager (322), an association manager (324), a rule manager (326), a capture manager (328), a prediction manager (330), and an object manager (332). The data manager (322) functions to capture digital media content and to identify objects from the captured content. In one embodiment, the data manager (322) captures the content from machines in communication with the server (310) across the network (305). The association manager (324), which is in communication with the data manager (322), functions to associate objects identified by the data manager (322) from the captured content with one or more keywords. The rule manager (326), which is in communication with the association manager (324), functions to identify one or more media surveillance rules associated with the associated keyword. More specifically, a grouping of keywords may be associated with a rule. The function of the rule manager (326) is to find the rule that applies to the keywords, as provided by the association manager (324). Once the rule has been identified, a capture manager (328) functions to apply the rule to a system. Accordingly, the capture manager (328) applies the rule to a system (370) to capture data and content.

As shown in FIG. 3, the system (370) is in communication with the server (310) across the network (305). In one embodiment, the system (370) may include an addressable component, and the server (310) may send the communication directly to the addressable component. The capturing of data described herein pertains to identified keywords and an associated rule. In one embodiment, the aspect of keywords and associated rules are dynamic; new rules may be dynamically created from existing keywords or new keywords. A prediction manager (330) is provided in communication with the association manager (324) to support the dynamic aspect of the keywords and rules. Specifically, the prediction manager (330) functions to predict one or more additional keywords, and the rule manager (326) identifies a rule associated with the additional keywords. In one embodiment, the rule manager (326) creates new rules from existing keywords or new keywords, or a combination of existing and new keywords. Accordingly, the prediction manager (330) supports dynamic modification and/or creation of rules and associated keywords.

The system as a whole functions in a dynamic manner to address the dynamic nature of data. As circumstances and associated data change, the system responds to these changes. This insures that new data captured in response to the rules is current and not stale. To support the dynamic aspect, an object manager (332) is provided in communication with the association manager (322). The object manager (332) functions in real-time to identify objects of interest in captured content and compare the captured content against the keywords of the applicable rule. In addition, the object manager (332) calculates a degree of confidence of an association between the captured content and the identified keyword. The degree of confidence is an indication of relevance of the captured content to the rule being applied. In one embodiment, when the degree of confidence exceeds a threshold value, an alert communication is sent to the system (370) to capture relevant data. Similarly, in one embodiment, the system (370) is a surveillance system to capture surveillance data. Accordingly, new data captured by the system (370) is in response to one or more established rules, keywords, and associated confidence.

The use of keywords and associated rules is dynamic. Specifically, new data is subject to evaluation for identification of keywords and associated rules. In one embodiment, the data manager (320) captures keywords from the new data captured by system (370), establishes a relationship among the captured keywords, and creates a new rule based on the established relationship. Accordingly, the data manager (320) dynamically creates new rules based upon captured data.

As identified above, the data manager (322), association manager (324), rule manager (326), capture manager (328), prediction manager (330), and object manager (332), hereinafter referred to as tools, function as elements to support the activity profiling. The tools (322)-(332) are shown residing in memory (316) local to the server (310). However, the tools (322)-(332) may reside as hardware tools external to memory (316), or they may be implemented as a combination of hardware and software. Similarly, in one embodiment, the tools (322)-(332) may be combined into a single functional item that incorporates the functionality of the separate items. As shown herein, each of the tools (322)-(332) are shown local to the server (310). However, in one embodiment they may be collectively or individually distributed across a network or multiple machines and function as a unit to profile activity and associated behavior. Accordingly, the tools may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit,"

"module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
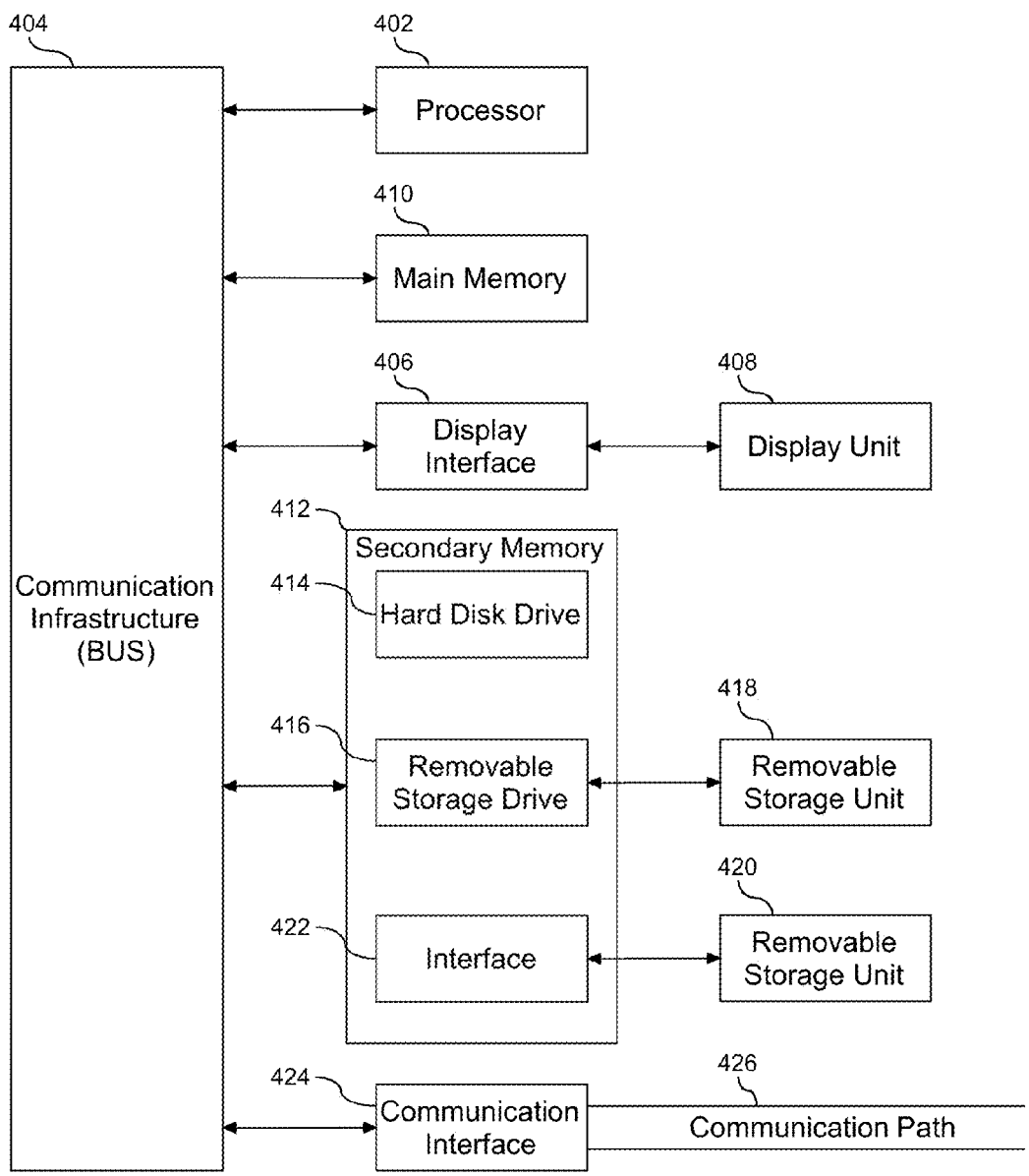
FIG. 4 depicts a block diagram showing a system for implementing an embodiment of the present invention.

Referring now to the block diagram of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) are in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A system comprising:
    a processor in communication with storage media;
    a functional unit in communication with the processor, the functional unit having tools to profile activity, the tools comprising:
        a data manager to capture digital media content and to identify one or more possible objects from the captured content;
        an association manager in communication with the data manager, the association manager to associate the identified objects with at least one keyword employed in a keyword relationship, wherein the keyword is mined data;
        a rule manager in communication with the association manager, the rule manager to identify at least one media surveillance rule associated with the at least one keyword employed in the keyword relationship; and
        a capture manager in communication with the rule manager, the capture manager to dynamically apply the identified media surveillance rule to a surveillance system to capture data associated with the identified rule and content, including capture of digital media content.

2. The system of claim 1, further comprising a prediction manager in communication with the association manager, the prediction manager to predict one or more additional keywords based on the associated keyword, and the rule manager to identify at least one additional media surveillance rule associated with the one or more additional keywords.

3. The system of claim 1, further comprising an object manager in communication with the association manager, the object manager to identify objects of interest in the captured content in real-time, including the object manager to compare the captured content against the identified keyword.

4. The system of claim 3, further comprising the object manager to calculate a degree of confidence of an association between the captured content and the identified keyword.

5. The system of claim 4, further comprising the object manager to send an alert communication to the surveillance system when the degree of confidence exceeds a defined threshold.

6. The system of claim 1, further comprising the data manager to extract two or more keywords from the captured content and to establish a relationship among the extracted keywords, and to create at least one new media surveillance rule based on the established relationship.

7. A computer program product for use with electronic communication data, the computer program product comprising a computer-readable non-transitory storage medium having computer readable program code embodied thereon, which when executed causes a computer to implement the method comprising:
    capturing digital media content;

identifying one or more possible objects from the captured content;

associating the identified objects with at least one keyword employed in a keyword relationship, wherein the keyword is mined data;

identifying at least one media surveillance rule associated with the at least one keyword employed in the keyword relationship; and dynamically applying the identified media surveillance rule to a surveillance system to capture data associated with the identified rule and content in real-time, including capturing digital media content.

8. The computer program product of claim 7, further comprising predicting one or more additional keywords based on the associated keyword, and identifying at least one additional media surveillance rule associated with the one or more additional keywords.

9. The computer program product of claim 7, further comprising identifying objects of interest in the captured content in real-time, including comparing the captured content against the identified keyword.

10. The computer program product of claim 9, further comprising calculating a degree of confidence of an association between the captured content and the identified keyword.

11. The computer program product of claim 10, further comprising sending an alert communication to the surveillance system when the degree of confidence exceeds a defined threshold.

12. The computer program product of claim 7, further comprising extracting two or more keywords from the captured content and establishing a relationship among the extracted keywords, and creating at least one new media surveillance rule based on the established relationship.

* * * * *